(12) United States Patent
Kim et al.

(10) Patent No.: US 9,720,864 B2
(45) Date of Patent: Aug. 1, 2017

(54) FLEXIBLE SERVER SYSTEM

(71) Applicants: Bum-Jun Kim, Seoul (KR); Woo-Seok Chang, Seoul (KR); Hye-Won Kang, Seoul (KR); Em-Hwan Kim, Yongin-si (KR); Kwang-Hyun La, Uiwang-si (KR); Su-Hwan Park, Seoul (KR); Jang-Won Lee, Seongnam-si (KR)

(72) Inventors: Bum-Jun Kim, Seoul (KR); Woo-Seok Chang, Seoul (KR); Hye-Won Kang, Seoul (KR); Em-Hwan Kim, Yongin-si (KR); Kwang-Hyun La, Uiwang-si (KR); Su-Hwan Park, Seoul (KR); Jang-Won Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 333 days.

(21) Appl. No.: 14/456,138

(22) Filed: Aug. 11, 2014

(65) Prior Publication Data
US 2015/0143018 A1    May 21, 2015

(30) Foreign Application Priority Data
Nov. 18, 2013 (KR) .......................... 10-2013-0139855

(51) Int. Cl.
*G06F 13/00* (2006.01)
*G06F 13/40* (2006.01)

(52) U.S. Cl.
CPC ............................. *G06F 13/4022* (2013.01)

(58) Field of Classification Search
CPC .................................................. G06F 13/4022

USPC .................................................. 710/316–317
See application file for complete search history.

(56) References Cited

U.S. PATENT DOCUMENTS

| | | | | |
|---|---|---|---|---|
| 6,035,414 A | * | 3/2000 | Okazawa | G06F 11/2005 370/217 |
| 7,058,738 B2 | * | 6/2006 | Stufflebeam, Jr. | G06F 13/4022 370/389 |
| 7,096,310 B2 | * | 8/2006 | Norden | G06F 13/4022 710/315 |
| 7,594,060 B2 | * | 9/2009 | Wilson | G06F 3/0611 710/305 |
| 7,613,864 B2 | * | 11/2009 | Torudbakken | G06F 13/4022 710/306 |
| 7,640,383 B2 | * | 12/2009 | Tseng | G06F 13/4022 710/104 |

(Continued)

*Primary Examiner* — Paul R Myers
(74) *Attorney, Agent, or Firm* — Harness, Dickey & Pierce, P.L.C.

(57) ABSTRACT

A flexible server system includes an embedded processor, one or more processor boards, one or more storage boards, and a switch including a plurality of ports. The embedded processor, the one or more processor boards, and the one or more storage boards are connected to a corresponding one of the plurality of ports. The embedded processor, the one or more processor boards, the one or more storage boards, and the switch each include a peripheral component interconnect express (PCIe) interface. The one or more processor boards and the one or more storage boards are connected to the switch through connectors where each of the corresponding connectors have a same size. The embedded processor controls the switch to route a packet from one of the plurality of ports to another one of the plurality of ports.

20 Claims, 10 Drawing Sheets

(56) References Cited

U.S. PATENT DOCUMENTS

| | | | |
|---|---|---|---|
| 7,676,625 B2* | 3/2010 | Cassiday | G06F 13/4022 710/305 |
| 7,991,839 B2 | 8/2011 | Freimuth et al. | |
| 8,144,582 B2 | 3/2012 | Brown et al. | |
| 8,200,880 B2* | 6/2012 | Higuchi | G06F 11/2017 370/402 |
| 8,291,148 B1 | 10/2012 | Shah et al. | |
| 8,463,934 B2 | 6/2013 | Maitra | |
| 8,868,814 B2* | 10/2014 | Higuchi | G06F 13/4022 710/313 |
| 8,990,468 B2* | 3/2015 | Suzuki | G06F 13/4081 710/301 |
| 9,361,038 B1* | 6/2016 | Radovanovic | H04L 67/1097 |
| 2004/0088469 A1* | 5/2004 | Levy | G06F 13/4282 710/316 |
| 2005/0160214 A1* | 7/2005 | Sauber | G06F 13/385 710/315 |
| 2005/0246460 A1* | 11/2005 | Stufflebeam, Jr. | G06F 13/4022 710/104 |
| 2006/0112210 A1* | 5/2006 | Tseng | G06F 13/4022 710/307 |
| 2007/0174733 A1* | 7/2007 | Boyd | G06F 11/0712 714/48 |
| 2007/0198763 A1* | 8/2007 | Suzuki | G06F 13/4022 710/316 |
| 2008/0052443 A1* | 2/2008 | Cassiday | G06F 13/4022 710/316 |
| 2010/0180062 A1* | 7/2010 | Hidaka | G06F 13/4022 710/314 |
| 2011/0069710 A1 | 3/2011 | Naven et al. | |
| 2012/0059957 A1* | 3/2012 | Millsaps | H04L 49/35 710/46 |
| 2012/0102491 A1 | 4/2012 | Maharana | |
| 2012/0278652 A1 | 11/2012 | Dawkins et al. | |
| 2013/0016720 A1 | 1/2013 | Chen et al. | |
| 2013/0060987 A1* | 3/2013 | Bolen | G06F 13/00 710/316 |
| 2013/0086295 A1 | 4/2013 | Hidaka et al. | |
| 2013/0089104 A1 | 4/2013 | Davis et al. | |
| 2013/0097351 A1 | 4/2013 | Davis et al. | |
| 2013/0110960 A1 | 5/2013 | Luo et al. | |
| 2013/0111229 A1 | 5/2013 | Borland et al. | |
| 2013/0111230 A1 | 5/2013 | Borland et al. | |
| 2013/0346667 A1* | 12/2013 | Stroud | G06F 13/385 710/316 |
| 2014/0075083 A1* | 3/2014 | Engebretsen | G06F 9/4411 710/316 |
| 2015/0067229 A1* | 3/2015 | Connor | G06F 13/4022 710/317 |

\* cited by examiner

FLEXIBLE SERVER SYSTEM

CROSS-REFERENCE TO RELATED APPLICATION

This application claims priority from Korean Patent Application No. 10-2013-0139855 filed on Nov. 18, 2013 in the Korean Intellectual Property Office, and all the benefits accruing therefrom under 35 U.S.C. 119, the contents of which in its entirety are herein incorporated by reference.

BACKGROUND

1. Field of the Inventive Concepts

The present inventive concepts relate to a flexible server system.

2. Description of the Related Art

A server system refers to a computer system providing information service to other computers in a network. The other computers receiving the information service, that is, computer systems sending a request for information to the server system and receiving information from the server system, are referred to as client systems.

The server system may be largely classified as a web server and a storage server according to a purpose of use of the server system.

In the conventional server system, since a processor, a storage device, and one or more peripheral devices have different interfaces from one another, a server system is constructed to be suitable for the server system's purpose of use at the time of designing the system. Therefore, when a storage server needs to be changed into a web server, or vice versa, the conventional server systems may need to be replaced with another server system that has a different purpose of use.

SUMMARY

The present inventive concepts provide a flexible server system, which can flexibly vary the number of processor boards and the number of storage boards according to workload.

At least one example embodiment relates to a flexible server system.

According to an aspect of the present inventive concepts, a flexible server system includes an embedded processor, one or more processor boards, one or more storage boards, and a switch including a plurality of ports. The embedded processor, the one or more processor boards, and the one or more storage boards are connected to a corresponding one of the plurality of ports. The embedded processor, the one or more processor boards, the one or more storage boards, and the switch each include a peripheral component interconnect express (PCIe) interface. The one or more processor boards and the one or more storage boards are connected to the switch through connectors where each of the corresponding connectors have a same size. The embedded processor controls the switch to route a packet from one of the plurality of ports to another one of the plurality of ports.

Example embodiments provide that a number of the one or more processor boards and a number of the one or more storage boards are variable.

Example embodiments provide that the plurality of ports of the switch include an upstream port and a plurality of downstream ports, and the embedded processor is connected to the upstream port and each of the one or more processor boards and the one or more storage boards are connected to a corresponding one of the downstream ports.

Example embodiments provide that the one or more processor boards operate as a host and the one or more storage boards operate as an end point.

Example embodiments provide that each of the embedded processor and the one or more processor boards include a root complex configured to connect each of the embedded processor and the one or more processor boards to the switch.

Example embodiments provide that the embedded processor is configured to read device codes of each of the one or more processor boards and each of the one or more storage boards using detection pins of each of the corresponding connectors. The device codes indicate a device type for each of the one or more processor boards and the one or more storage boards. The embedded processor is configured to classify at least one of the one or more processor boards and the one or more storage boards according to the device codes.

Example embodiments provide that the device codes of the one or more processor boards indicate that the one or more processor boards are configured as bridge devices, and the device codes of the one or more storage boards indicate that the one or more storage boards are configured as storage devices.

Example embodiments provide that the one or more storage boards provide single root I/O virtualization (SR-IOV).

Example embodiments provide that each of the corresponding connectors support a peripheral component interconnect-express (PCIe) interface, a small computer system interface (SCSI), a serial attached SCSI (SAS) interface, and a serial advanced technology attachment (SATA) interface.

Example embodiments provide that the flexible server system further includes one or more network cards. The one or more network cards include a PCIe interface. The one or more network cards are connected to a corresponding one of the plurality of ports.

Example embodiments provide that the one or more storage boards includes a solid state drive supporting a non-volatile memory express (NVMe) interface.

Example embodiments provide that the flexible server system is configured to operate as a web server system when a number of the one or more processor boards is greater than a number of the one or more storage boards. The flexible server system is configured to operate as a storage server system when the number of the one or more storage boards is greater than the number of the one or more processor boards.

According to another aspect of the present inventive concepts, a flexible server system includes two or more processor boards, one or more storage boards, and a switch including a plurality of ports. The two or more processor boards and the one or more storage boards are connected to a corresponding one of the plurality of ports. Each of the one or more processor boards, the one or more storage boards, and the switch include a peripheral component interconnect express (PCIe) interface. The two or more processor boards and the one or more storage boards are connected to the switch through a corresponding connector where each of the corresponding connectors having a same size. One of the processor boards of the two or more processor boards controls the switch to route a packet from one of the plurality of ports to another one of the plurality of ports.

Example embodiments provide that the number of the two or more processor boards and the number of the one or more storage boards are variable.

Example embodiments provide that the plurality of ports of the switch include an upstream port and a plurality of downstream ports, and the one of the two or more processor boards is connected to the upstream port and the other processor board of the two or more processor boards and the one or more storage boards are each connected to a corresponding one of the downstream ports.

Example embodiments provide that each of the two or more processor boards operate as a host, and each of the one or more storage boards operate as an end point.

According to another example embodiment, a flexible server system includes a plurality of processor boards and a plurality of storage boards. The flexible server system is configured to operate as a web server system when a number of the plurality of processor boards is greater than a number of the plurality of storage boards, and operate as a storage server system when the number of the plurality of storage boards is greater than the number of the plurality of processor boards.

Example embodiments provide that the number of the plurality of processor boards and the number of the plurality of storage boards are variable.

Example embodiments provide that the flexible server system further includes an embedded processor configured to communicate with the plurality of storage boards, the plurality of processor boards, and a plurality of network cards via a switch.

Example embodiments provide that the embedded processor and the plurality of processor boards each include a root complex. The root complex is configured to connect the embedded processor and the plurality of processor boards to the switch, and generate a plurality of transaction requests.

BRIEF DESCRIPTION OF THE DRAWINGS

The above and other features and advantages of the present inventive concepts will become more apparent by describing the example embodiments with reference to the attached drawings in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process. Thus, regions shown in the drawings are illustrated in schematic form and the shapes of the regions are presented simply by way of illustration and not as a limitation.

Figure 1:
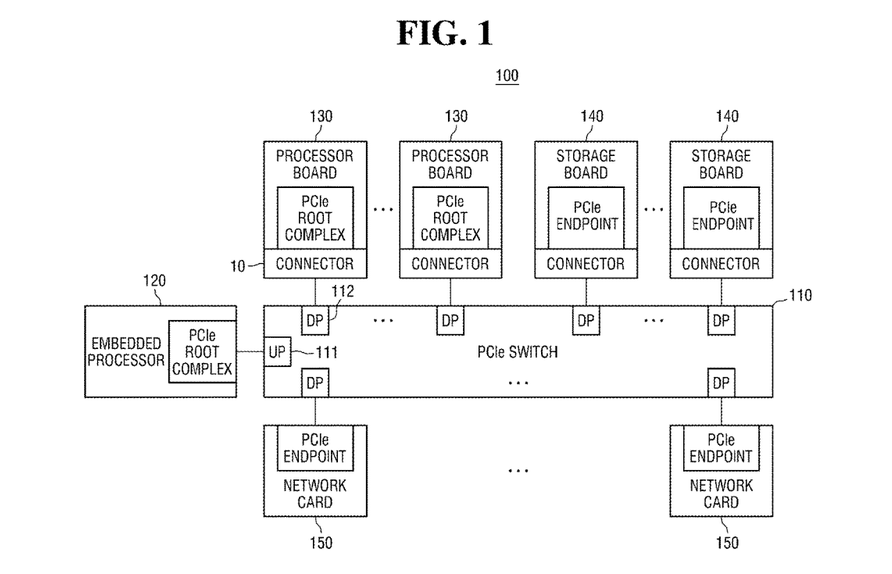
FIG. 1 is a block diagram of a flexible server system, according to an example embodiment of the present inventive concepts.
Figure 2:
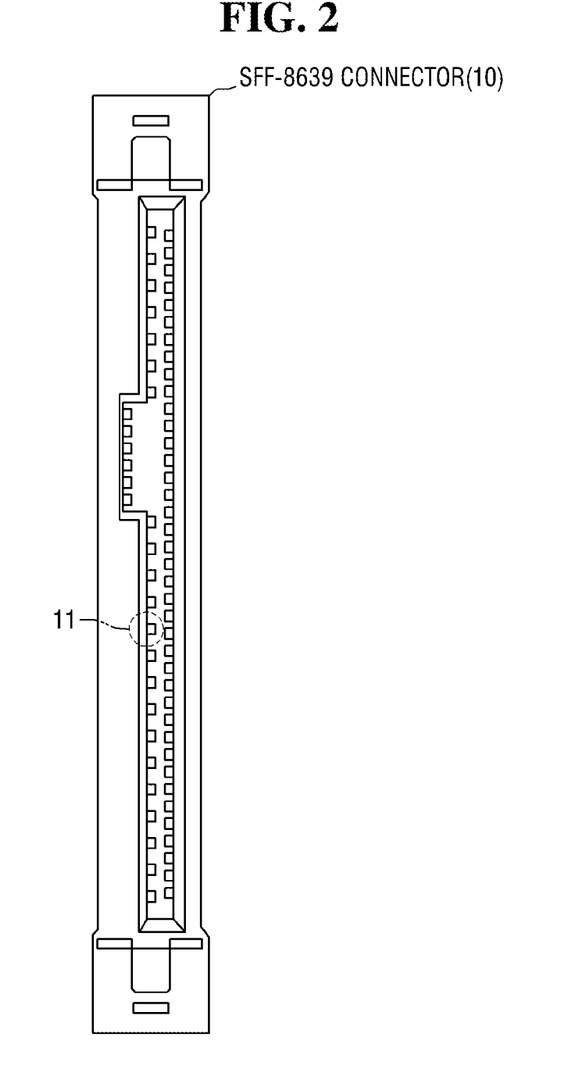
FIG. 2 illustrates a connector of the flexible server system shown in FIG. 1 in which processor boards and storage boards are mounted, according to an example embodiment.

FIG. 1 is a block diagram of a flexible server system according to an example embodiment of the present inventive concepts and FIG. 2 illustrates a connector of the flexible server system shown in FIG. 1 in which processor boards and storage boards are mounted, according to an example embodiment.

Referring to FIG. 1, the flexible server system 100 according to an example embodiment of the present inventive concepts include a peripheral component interconnect express (PCIe) switch 110, an embedded processor 120, a plurality of processor boards 130, a plurality of storage boards 140, and a plurality of network cards 150.

The PCIe switch 110 may include a plurality of ports 111 and 112. The plurality of ports may include an upstream port 111 (UP) and a plurality of downstream ports 112 (DP). The PCIe switch 110 may route a packet from one among the plurality of ports 111 and 112 to another among the plurality of ports 111 and 112. The packet is a unit of data that is formatted for transmission through a communications network. In various embodiments, a packet may include control information and payload data.

The PCIe switch 110 may be formed on a system board (e.g., a mother board, a main board, and the like). Here, the system board may be a main printed circuit board of the server system 100. The system board may include major components of the server system, such as one or more processors, computer-readable media, network cards, connectors for one or more peripheral devices, and/or other like components (not shown).

The PCIe switch 110 may have a peripheral component interconnect express (PCIe) interface (not shown).

A basic link of the PCIe interface includes a lane, which may include different signal pairs. For example, one lane may include a signal pair for transmitting data and a signal pair for receiving data. In various embodiments, each lane may be used as a full-duplex byte stream, such that each lane may transport packets in an eight bit format. Additionally, the PCIe interface communicates via an interconnect or link, where each link includes one or more lanes. A link is a point-to-point communication channel between two PCIe ports, allowing both PCIe boards to send and/or receive PCIe requests, such as configuration read/write, I/O read/write, memory read/write, and interrupts. According to various embodiments, the PCIe interface may use a single lane (x1) link, two lane (x2) link, four lane (x4) link, eight lane (x8) link, sixteen lane (x16) link, or a thirty-two lane (x32) link may be used, when an xN link includes N lanes. However, aspects of the present inventive concepts are not limited thereto.

The embedded processor 120 may be configured to process data. The embedded processor 120 may be an embedded processor formed on the system board.

The embedded processor 120 may be programmed to control the PCIe switch 110. The embedded processor 120 may function as a management processor that may control the PCIe switch 110.

The plurality of processor boards 130 may be configured to process data. The plurality of processor boards 130 may be sub-systems of the flexible server system 100 and may include boards formed separately from the system board.

The embedded processor 120 and the plurality of processor boards 130 may drive or otherwise operate independent operating systems. According to various embodiments, the plurality of processor boards 130 and the embedded processor 120 may drive or otherwise operate the same operating system or different operating systems. Additionally, in various embodiments, the embedded processor 120 and the plurality of processor boards 130 may operate independently of each other.

The plurality of storage boards 140 may be configured to store data. The plurality of storage boards 140 may be sub-systems of the flexible server system 100 and may include boards formed separately from the system board.

For example, each of the storage boards 140 may include at least one solid state drive (SSD), and/or any other like memory devices; however, aspects of the present inventive concepts are not limited thereto. The solid state drive may include a semiconductor memory to store data. For example, the solid state drive may include a non-volatile memory, such as a flash memory and the like. The solid state drive may support a non-volatile memory express (NVMe) interface to perform high-speed communication.

The plurality of storage boards 140 may provide single root IO virtualization (SR-IOV). SR-IOV allows multiple virtual machines to access a single device in a virtualization environment. However, for the sake of brevity, a detailed description thereof will not be given.

Referring to FIG. 2, the plurality of processor boards 130 and the plurality of storage boards 140 may be mounted on connectors 10 of the system board such that the plurality of storage boards 140 are connected to the system board. The plurality of processor boards 130 and the plurality of storage boards 140 may be mounted on the connectors 10 having the same size. Therefore, the plurality of processor boards 130 and the plurality of storage boards 140 may have the same connector specification.

The connectors 10 may be a small computer system interface (SCSI), a serial attached SCSI (SAS) interface, and/or a serial advanced technology attachment (SATA) interface in addition to the PCIe interface. For example, a multifunction 12 Gb/s 6× unshielded connector (SFF-8639) may be used as the connector 10.

The connector 10 may include a plurality of pins (or alternatively, contacts) and the plurality of pins may include detection pins 11. The detection pins 11 detect connections between the connector 10 and devices (the processor boards 130 or the storage boards 140) and may be used to read codes of the devices.

Referring again to FIG. 1, the plurality of network cards 150 may communicate with an external network. For example, the network cards 150 may be Ethernet cards, and/or other like network cards; however, aspects of the present inventive concepts are not limited thereto.

The plurality of network cards 150 may provide single root I/O virtualization (SR-IOV). The SR-IOV may provide a set of virtualization methods based on PCIe hardware. In various embodiments, the network cards are configured to communicate with one or more external devices using a network communications protocol.

The embedded processor 120, the plurality of processor boards 130, the plurality of storage boards 140 and the plurality of network cards 150 may have the PCIe interface.

The embedded processor 120, the plurality of processor boards 130, the plurality of storage boards 140 and the plurality of network cards 150 may be connected to the plurality of ports 111 and 112 of the PCIe switch 110. The embedded processor 120 may be connected to one upstream port 111 of the PCIe switch 110. The plurality of processor boards 130, the plurality of storage boards 140, and the plurality of network boards 150 may be connected to the plurality of downstream ports 112 of the PCIe switch 110. Accordingly, a PCIe cluster or a PCIe network may be configured according to the embodiment shown in FIG. 1.

The embedded processor 120 may communicate with the plurality of processor boards 130, the plurality of storage boards 140 and the plurality of network cards 150 through the PCIe switch 110. In addition, each of the processor boards 130 may communicate with other processor boards 130, the plurality of storage boards 140, and the plurality of network cards 150 through the PCIe switch 110.

The embedded processor 120 and the plurality of processor boards 130, each including a root complex, may operate as hosts in the PCIe cluster. The root complex may connect the processor to the PCIe switch 110 via connector 10. The root complex may generate a plurality of transaction requests on behalf of the processor. The plurality of transaction requests may include different types of requests. For example, the plurality of transaction requests may include a configuration request, a memory request, an input/output (I/O) request, a message request, and/or other like transaction requests.

The plurality of storage boards 140 may operate as end points in the PCIe cluster.

Figure 3A:
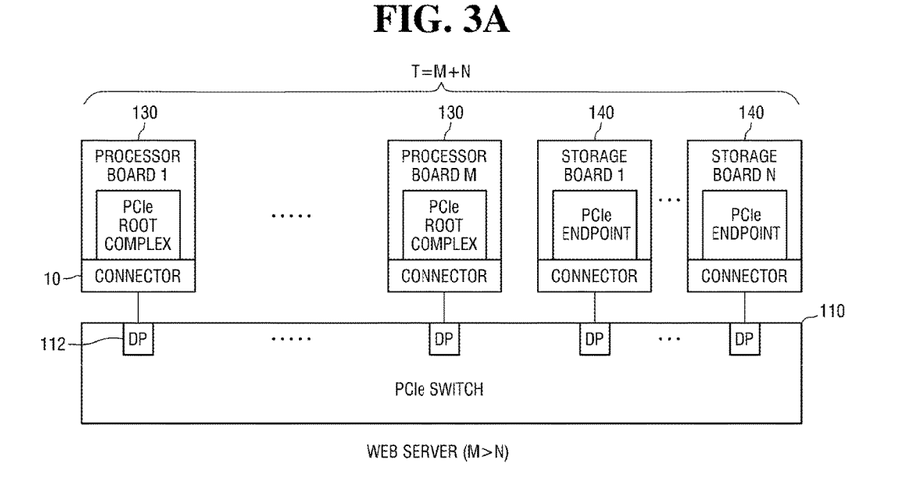
FIGS. 3A and 3B illustrate that the number of processor boards and the number of storage boards flexibly vary according to the workload in the flexible server system shown in FIG. 1, according to an example embodiment.
Figure 3B:
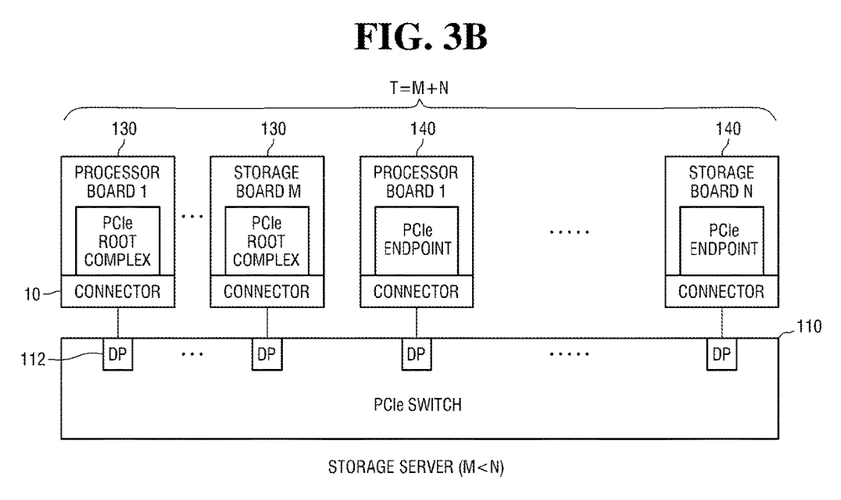

FIGS. 3A and 3B illustrate that the number of processor boards and the number of storage boards flexibly vary according to the workload in the flexible server system shown in FIG. 1, according to an example embodiment.

For the sake of brevity, only the PCIe switch 110, the processor boards 130 and the storage boards 140 are illustrated in FIGS. 3A and 3B.

Referring to FIGS. 3A and 3B, the flexible server system 100 may include M processor boards 130 and N storage boards 140. The total number of nodes of the flexible server system 100 may be maintained to be T, where T=M+N. Here, the nodes indicate exchange points of links in a PCIe cluster having a tree structure, and one or more of the processor boards 130 and one or more of the storage boards 140 may function as nodes. In various embodiments, a server system may have a purpose of use as a web server when the number of processor boards 130 (M) is greater than the number of storage boards 140 (N). As shown in FIG. 1, the flexible server system 100 is configured as a web server system because the number of processor boards 130 is greater than the number of storage boards 130. In various embodiments, a server system may have a purpose of use as a storage server when the number of storage boards 140 (N) is greater than the number of processor boards 130 (M). Thus, the flexible server system 100 may be configured as a storage server system when the number of storage boards 130 is greater than the number of processor boards 130.

In the flexible server system 100 shown in FIG. 1, since the plurality of processor boards 130 and the plurality of storage boards 140 are mounted on the connectors 10 having the same size, the processor boards 130 and the storage boards 140 can be exchanged.

Accordingly, in the flexible server system 100 shown in FIG. 1, the number of processor boards 130 and the number of storage boards 140 may flexibly vary according to the workload. For example, an operator may exchange one or more of the processor boards 130 for one or more of the storage boards 140 in order to configure the flexible server system 100 as a web server system based on a workload of the flexible server system 100. Alternatively, an operator may exchange one or more of the storage boards 140 for one or more of the processor boards 130 in order to configure the flexible server system 100 as a storage server system based on a workload of the flexible server system 100.

As an example, as shown in FIG. 3A, in a case where a web server is necessary, the storage board 140 may be replaced with the processor board 130 and the replacement processor board 130 may be installed on the connector 10, and thus, a web server system may be configured to include a large number of processor boards 130 relative to a number of storage boards 140.

As another example, as shown in FIG. 3B, in a case where a storage server is necessary, the processor board 130 may be replaced with the storage board 140 and the replacement storage board 140 may be installed on the connector 10, and thus, the web server system may be configured to include a large number of storage boards 140 relative to a number of processor boards 130.

In the flexible server system 100, since the number of processor boards 130 and the number of storage boards 140 may flexibly vary according to the workload, the flexible server system 100 can be easily modified according to a variety of purposes of use.

Figure 4:
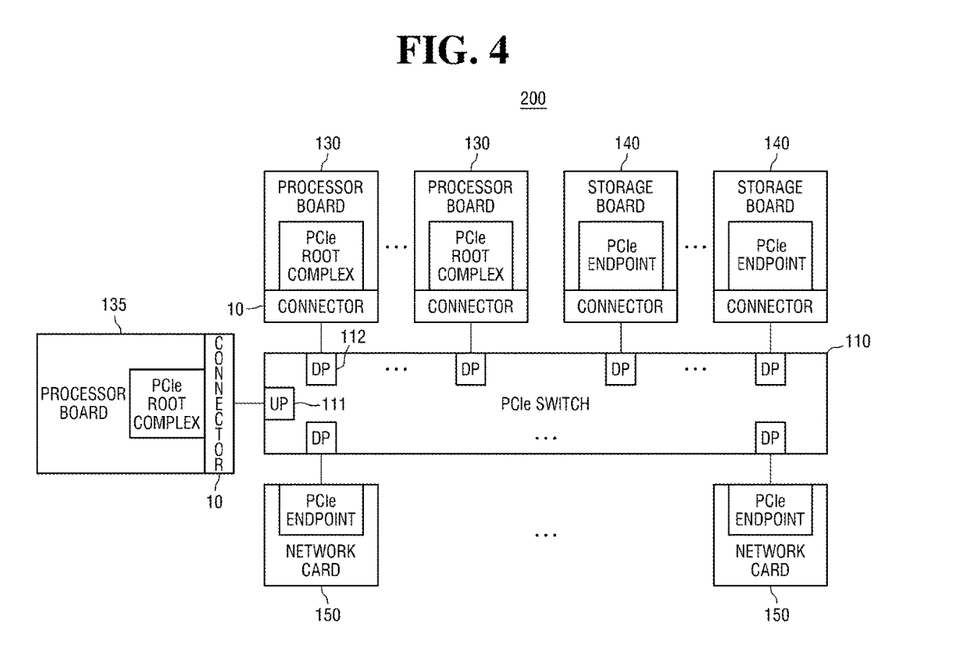
FIG. 4 is a block diagram of a flexible server system according to an example embodiment of the present inventive concepts.

FIG. 4 is a block diagram of a flexible server system, according to an example embodiment of the present inventive concepts.

Referring to FIG. 4, the flexible server system 200 according to another example embodiment of the present inventive concepts includes a PCIe switch 110, a plurality of processor boards 130 and 135, a plurality of storage boards 140, and a plurality of network cards 150.

The PCIe switch 110 may include a plurality of ports 111 and 112. The plurality of ports may include one upstream port 111 and a plurality of downstream ports 112. The PCIe switch 110 may route a packet from one among the plurality of ports 111 and 112 to another among the plurality of ports 111 and 112.

The PCIe switch 110 may be formed on a system board. The system board may be the same or similar to the system board described above with respect to FIG. 1.

The PCIe switch 110 may have a PCIe interface. The PCIe interface 110 may be the same or similar to the PCIe interface 110 described above with respect to FIG. 1.

The plurality of processor boards 130 and 135 may be configured to process data. The plurality of processor boards 130 and 135 may be sub-systems of the flexible server system 200 and may include boards formed separately from the system board.

Among the plurality of processor boards 130 and 135, one processor board 135 may be programmed to control the PCIe switch 110. The processor board 135 may function as a management processor that may control the PCIe switch 110.

The plurality of processor boards 130 and 135 may drive or otherwise operate independent operating systems. According to various embodiments, the plurality of processor boards 130 and 135 may drive or otherwise operate the same operating system or different operating systems. The plurality of processor boards 130 and 135 may operate independently of each other.

The plurality of storage boards 140 may be configured to store data. The plurality of storage boards 140 may be sub-systems of the flexible server system 200 and may include boards formed separately from the system board.

For example, each of the storage hoards 140 may include a solid state drive supporting an non-volatile memory express (NVMe) interface, an Advanced Host Controller Interface (AHCI) interface, or other like interfaces; however, aspects of the present inventive concepts are not limited thereto.

The plurality of storage boards 140 may provide SR-IOV.

The plurality of processor boards 130 and 135 and the plurality of storage boards 140 may be mounted on the connector 10 of the system board described with reference to FIG. 2 to then be connected to the system board. For example, a SFF-8639 connector may be provided as the connector 10.

The plurality of network cards 150 may communicate with external networks.

The plurality of network cards 150 may provide SR-IOV.

The plurality of processor boards 130 and 135, the plurality of storage boards 140 and the plurality of network cards 150 may have the PCIe interface.

The plurality of processor boards 130 and 135, the plurality of storage boards 140 and the plurality of network cards 150 may be connected to the plurality of ports 111 and 112 of the PCIe switch 110. The processor board 135 is connected to the upstream port 111 of the PCIe switch 110. The plurality of processor boards 130, the plurality of storage boards 140, and the plurality of network boards 150 are connected to the plurality of downstream ports 112 of the PCIe switch 110. Accordingly, a PCIe cluster or a PCIe network may be configured according to the embodiment shown in FIG. 4.

The plurality of processor boards 130 and 135 130 each including a root complex may operate as hosts in the PCIe cluster. The root complex may connect the processor to the PCIe switch 110 via connector 10. The root complex may generate a plurality of transaction requests on behalf of the processor.

The plurality of storage boards 140 may operate as end points in the PCIe cluster.

Figure 5:
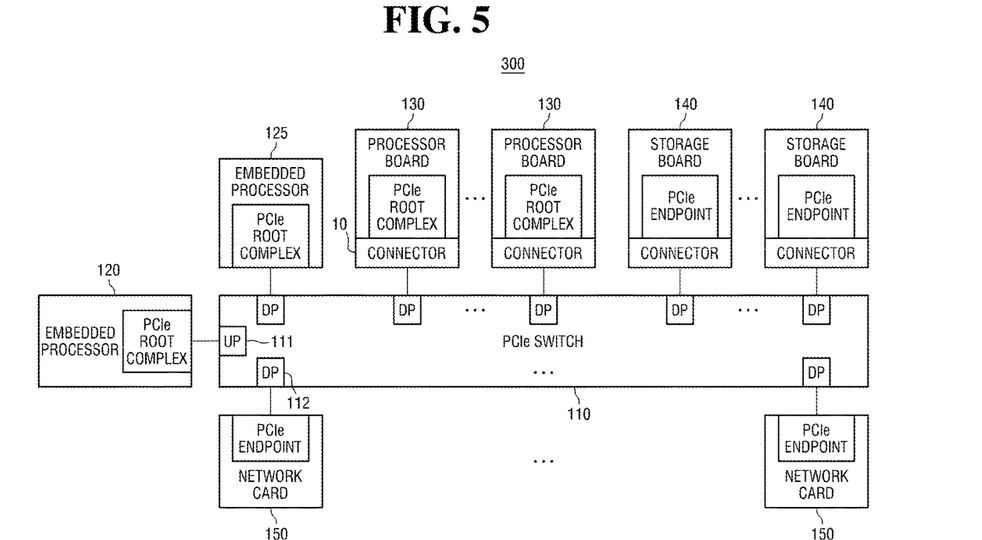
FIG. 5 illustrates a flexible server system according to an example embodiment of the present inventive concepts.

FIG. 5 illustrates a flexible server system according to another example embodiment of the present inventive concepts.

Referring to FIG. 5, the flexible server system 300 according to another example embodiment of the present inventive concepts includes a PCIe switch 110, a plurality of embedded processors 120 and 125, a plurality of processor boards 130, a plurality of storage boards 140, and a plurality of network cards 150.

The PCIe switch 110 may include a plurality of ports 111 and 112. The plurality of ports may include an upstream port 111 (UP) and a plurality of downstream ports 112 (DP). The PCIe switch 110 may route a packet from one among the plurality of ports 111 and 112 to another among the plurality of ports 111 and 112.

The PCIe switch 110 may be formed on a system board. The system board may be the same or similar to the system board described above with respect to FIGS. 1 and 4.

The PCIe switch 110 may have a PCIe interface. The PCIe interface may be the same or similar to the PCIe interface described above with respect to FIGS. 1 and 4.

The plurality of embedded processors 120 and 125 may be configured to process data. The plurality of embedded processors 120 and 125 may be embedded processors formed on the system board.

One embedded processor 120 among the plurality of embedded processors 120 and 125 may be programmed to control the PCIe switch 110. The embedded processors 120 and 125 may function as management processors controlling the PCIe switch 110.

The plurality of processor boards 130 may be configured to process data. The plurality of processor boards 130 may be sub-systems of the server system 300 and may include boards formed separately from the system board.

The plurality of embedded processors 120 and 125 may drive or otherwise operate independent operating systems. The plurality of processor boards 130 may also drive or otherwise operate operating systems independently of the plurality of embedded processors 120 and 125. According to various embodiments, the plurality of embedded processors 120 and 125 and the plurality of processor boards 130 may drive or otherwise operate the same operating system or different operating systems. The plurality of embedded processors 120 and 125 and the plurality of processor boards 130 may operate independently of each other.

The plurality of storage boards 140 may be configured to store data. The plurality of storage boards 140 may be sub-systems of the server system 300 and may include boards formed separately from the system board.

For example, each of the storage boards 140 may include a solid state drive supporting an NVMe interface, an Advanced Host Controller Interface (AHCI) interface, or other like interfaces; however, aspects of the present inventive concepts are not limited thereto.

The plurality of storage boards 140 may provide SR-IOV.

The plurality of processor boards 130 and the plurality of storage boards 140 may be mounted on the connector 10 of the system board described with reference to FIG. 2 to then be connected to the system board. For example, a SFF-8639 connector may be provided as the connector 10.

The plurality of network cards 150 may communicate with external networks.

The plurality of network cards 150 may provide SR-IOV.

The plurality of embedded processors 120 and 125, the plurality of processor boards 130, the plurality of storage boards 140 and the plurality of network cards 150 may have the PCIe interface.

The plurality of embedded processors 120 and 125, the plurality of processor boards 130, the plurality of storage boards 140 and the plurality of network cards 150 may be connected to the plurality of ports 111 and 112 of the PCIe switch 110. The embedded processor 120 is connected to the one upstream port 111 of the PCIe switch 110. The embedded processors 125, the plurality of processor boards 130, plurality of storage boards 140, and the plurality of network boards 150 are connected to the plurality of downstream ports 112 of the PCIe switch 110. Accordingly, a PCIe cluster or a PCIe network may be configured as shown in FIG. 5.

The plurality of embedded processors 120 and 125 and the plurality of processor boards 130, each including a root complex, may operate as hosts in the PCIe cluster. The root complex may connect the processor to the PCIe switch 110 via connector 10. The root complex may generate a plurality of transaction requests on behalf of the processor.

The plurality of storage boards 140 may operate as end points in the PCIe cluster.

According to various embodiments, the flexible server system 300 may be modified to be programmed such that one among the plurality of processor boards 130 controls the PCIe switch 110. In such embodiments, one processor board among the plurality of processor boards 130 may be connected to the upstream port 111 of the PCIe switch 110.

Figure 6:
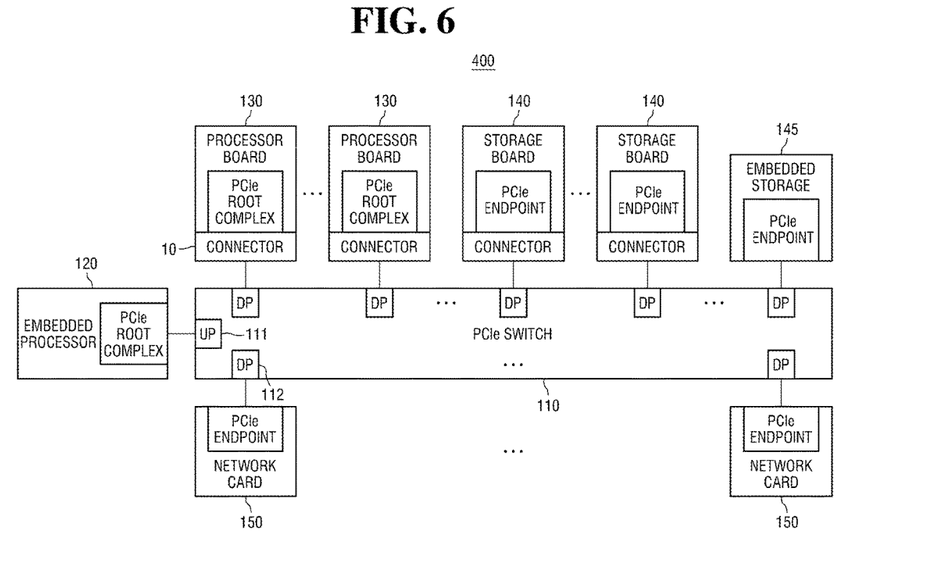
FIG. 6 is a block diagram of a flexible server system, according to an example embodiment of the present inventive concepts.

FIG. 6 is a block diagram of a flexible server system according to another example embodiment of the present inventive concepts.

Referring to FIG. 6, the flexible server system 400 according to another example embodiment of the present inventive concepts includes a PCIe switch 110, an embedded processor 120, a plurality of processor boards 130, a plurality of storage boards 140, an embedded storage 145, and a plurality of network cards 150.

The PCIe switch 110 may include a plurality of ports 111 and 112. The plurality of ports may include an upstream port 111 (UP) and a plurality of downstream ports 112 (DP). The PCIe switch 110 may route a packet from one among the plurality of ports 111 and 112 to another among the plurality of ports 111 and 112.

The PCIe switch 110 may be formed on a system board. The PCIe switch 110 may have a PCIe interface.

The embedded processor 120 may be configured to process data. The embedded processor 120 may be an embedded processor formed on the system board.

The embedded processor 120 may be programmed to control the PCIe switch 110. The embedded processor 120 may function as a management processor that may control the PCIe switch 110.

The plurality of processor boards 130 may be configured to process data. The plurality of processor boards 130 may be sub-systems of the server system 400 and may include boards formed separately from the system board.

The embedded processor 120 and the plurality of processor boards 130 may drive or otherwise operate independent operating systems. According to various embodiments, the embedded processor 120 and the plurality of processor boards 130 may drive or otherwise operate the same operating system or different operating systems. The embedded processor 120 and the plurality of processor boards 130 may operate independently of each other.

The plurality of storage boards 140 may be configured to store data. The plurality of storage boards 140 may be sub-systems of the server system 400 and may include boards formed separately from the system board.

For example, each of the storage boards 140 may include a solid state drive supporting an NVMe interface, an Advanced Host Controller Interface (AHCI) interface, or other like interfaces; however, aspects of the present inventive concepts are not limited thereto.

The plurality of storage boards 140 may provide SR-IOV.

The plurality of processor boards 130 and the plurality of storage boards 140 may be mounted on the connector 10 of the system board described with reference to FIG. 2 to then be connected to the system board. For example, a SFF-8639 connector may be provided as the connector 10.

The embedded storage 145 may be configured to store data. The embedded storage 145 may be an embedded storage formed on the system board.

The embedded storage 145 may provide SR-IOV.

The plurality of network cards 150 may communicate with external networks.

The plurality of network cards 150 may provide SR-IOV.

The embedded processor 120, the plurality of processor boards 130, the plurality of storage boards 140, the embedded storage 145 and the plurality of network cards 150 may have the PCIe interface.

The embedded processor 120, the plurality of processor boards 130, the plurality of storage boards 140, the embedded storage 145 and the plurality of network cards 150 may be connected to the plurality of ports 111 and 112 of the PCIe switch 110.

The embedded processor 120 may be connected to one upstream port 111 of the PCIe switch 110. The plurality of processor boards 130, the plurality of storage boards 140, the embedded storage 145, and the plurality of network boards 150 may be connected to the plurality of downstream ports 112 of the PCIe switch 110. Accordingly, a PCIe cluster or a PCIe network may be configured as shown in FIG. 6.

The embedded processor 120 and the plurality of processor boards 130, each including a root complex, may operate as hosts in the PCIe cluster. The root complex may connect the processor to the PCIe switch 110 via connector 10. The root complex may generate a plurality of transaction requests on behalf of the processor.

According to various embodiments, the flexible server system 400 shown in FIG. 6 may be modified to be programmed such that one of the plurality of processor boards 130 controls the PCIe switch 110. In such embodiments, the one processor board among the plurality of processor boards 130 may be connected to the upstream port 111 of the PCIe switch 110.

Figure 7:
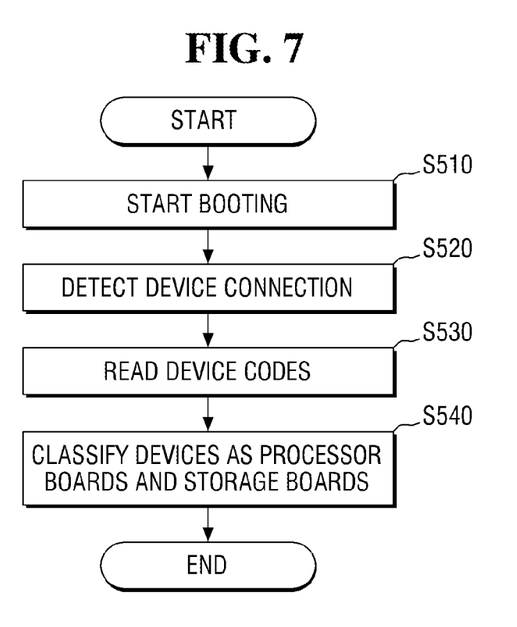
FIG. 7 is a flowchart illustrating an operating method of flexible server systems, according to an example embodiment of the present inventive concepts.

FIG. 7 is a flowchart illustrating an operating method of flexible server systems according to an example embodiments of the present inventive concepts. The operating method may be operated by one of the flexible server systems 100, 200, 300, 400, and/or another like flexible server system.

Referring to FIG. 7, as shown in operation S510, a management processor starts a booting process (i.e., "booting"). As described above, the embedded processor 120 or the processor board 135 may function as the management processor. In such embodiments, the embedded processor 120 or the processor board 135 functioning as the management processor may initialize the booting process.

As shown in operation S520, the management processor detects connections of devices using the detection pins 11 of the connector 10. As described above, the devices may include the plurality of processor boards 130 and the plurality of storage boards 140 connected to the PCIe switch 110. In embodiments where, the embedded processor 120 functions as the management processor, connections of the plurality of processor boards 130 and the plurality of storage boards 140 connected to the PCIe switch 110 are detected. In addition, in embodiments where the processor board 135 functions as the management processor, connections of other processor boards 130 and the plurality of other storage boards 140 connected to the PCIe switch 110 are detected.

As shown in operation S530, the management processor reads device codes. The management processor reads codes of the devices using the detection pins 11 of the connector 10. The device codes may indicate a device type for each of the devices. The devices connected to the PCIe switch 110 may include configuration spaces. Device codes of the devices may be configured (or alternatively, "preconfigured") in the configuration spaces.

For example, codes of the processor boards 130 may be configured as "bridge devices," codes of the storage boards 140 may be configured as "storage devices" and codes of the network cards 150 may be configured as "network devices." The "bridge devices" may be devices connecting the plurality of PCIe clusters to each other. The respective processor boards 130 may connect a PCIe cluster to another PCI cluster or a PCI-X cluster.

As shown in operation S540, the devices are classified as the processor boards 130 or the storage boards 140 according to the read codes. Once the devices are classified, the operating method ends.

Figure 8:
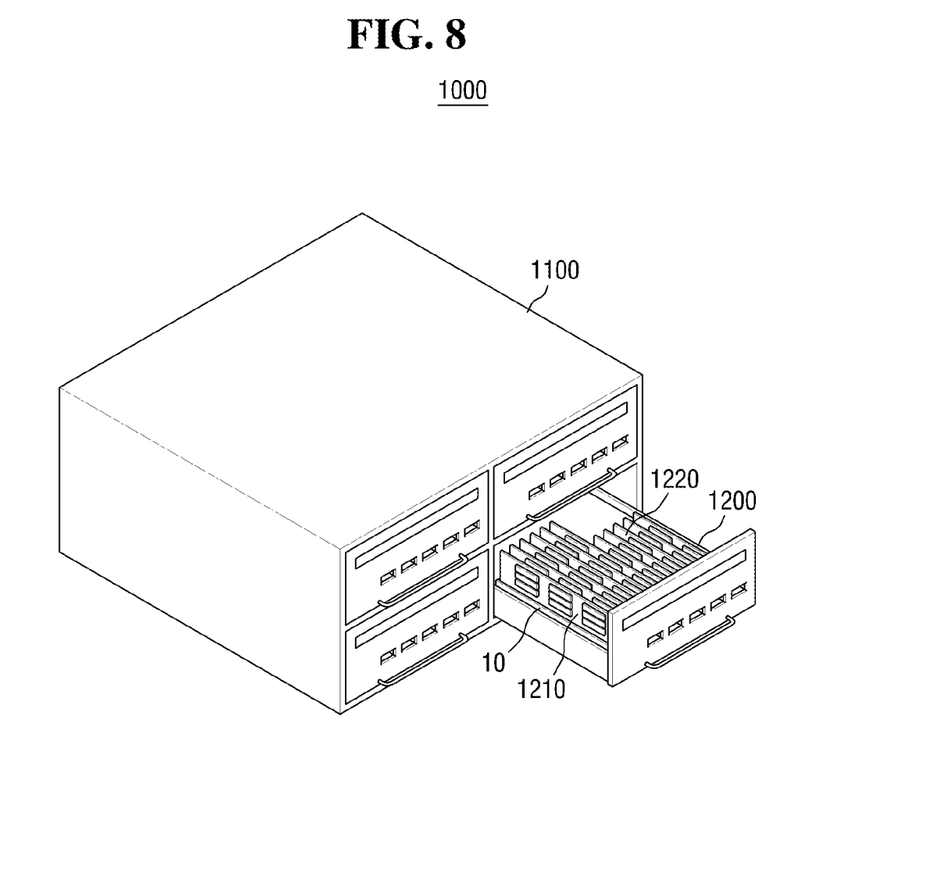
FIGS. 8 and 9 illustrate a server chassis to which flexible server systems, according to an example embodiment of the present inventive concepts.
Figure 9:
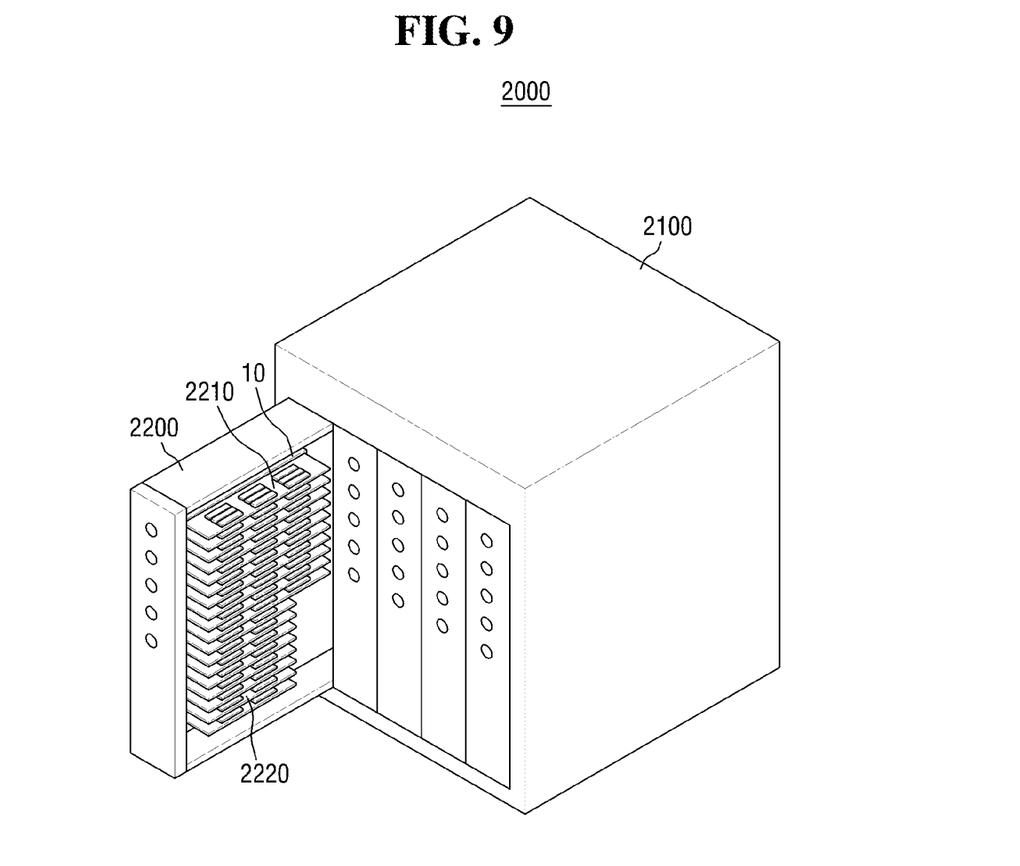

FIGS. 8 and 9 illustrate a server chassis to which flexible server systems, according to an example embodiment of the present inventive concepts. The flexible server system may be applied or installed in the server chassis as shown in FIGS. 8 and 9. Specifically, FIG. 8 illustrates a sled type server chassis and FIG. 9 illustrates a blade type server chassis.

Referring to FIG. 8, the sled type server chassis 1000 may include a main body 1100 and a plurality of sled servers 1200 installed in the main body 1100.

The main body 1100 may include resources and/or components, such as a power supply, an input/output device, peripheral devices, and the like (not shown).

The plurality of sled servers 1200 may receive various kinds of resources from the main body 1100 and may function as servers.

The plurality of sled servers 1200 may include the flexible server systems 100, 200, 300 and/or 400 shown in FIGS. 1 and 4-6. The plurality of sled servers 1200 may include a system board having the connector 10 shown in FIG. 2, and the plurality of processor boards 1210 and/or the plurality of storage boards 1220 may be mounted on the connector 10. The system board may or may not include an embedded processor. In addition, the system board may or may not include an embedded storage.

In the plurality of sled servers 1200, the number of processor boards 1210 and the number of storage boards 1220 may flexibly vary according to the workload. For example, an operator may exchange one or more of the processor boards 1210 for one or more of the storage boards 1220 in order to configure one or more of the flexible server systems of one or more of the plurality of sled servers 1200 as a web server system based on a workload of the one or more flexible server systems. Alternatively, an operator may exchange one or more of the storage boards 1220 for one or more of the processor boards 1210 in order to configure one or more flexible server systems of one or more of the plurality of sled servers 1200 as a storage server system based on a workload of the one or more flexible server systems.

In various embodiments, the number of processor boards 1210 may be compared with the number of storage boards 1220, and a relatively large number of processor boards 1210 may be mounted on the plurality of sled servers 1200 to architect or otherwise configure the sled server 1200 as a web server system.

Referring to FIG. 9, the blade type server chassis 2000 may include a main body 2100 and a plurality of blade servers 2200 installed in the main body 2100.

The main body 2100 may include resources and/or components, such as a power supply, an input/output device, peripheral devices, and the like (not shown).

The plurality of blade servers 2200 may receive various kinds of resources from the main body 2100 and may function as servers.

The blade servers 2200 may include the flexible server systems 100, 200, 300 and 400 shown in FIGS. 1 and 4 to 6. The plurality of blade servers 2200 may include a system board having the connector 10 shown in FIG. 2, and the plurality of processor boards 2210 and/or the plurality of storage boards 2220 may be mounted on the connector 10. The system board may or may not include an embedded processor. In addition, the system board may or may not include an embedded storage.

In the blade servers 2200, the number of processor boards 2210 and the number of storage boards 2220 may flexibly vary according to the workload. For example, an operator may exchange one or more of the processor boards 2210 for one or more of the storage boards 2220 in order to configure one or more of the flexible server systems of one or more of the plurality of blade servers 2200 as a web server system based on a workload of the one or more flexible server systems. Alternatively, an operator may exchange one or more of the storage boards 2220 for one or more of the processor boards 2210 in order to configure one or more flexible server systems of one or more of the plurality of blade servers 2200 as a storage server system based on a workload of the one or more flexible server systems.

In various embodiments, the number of processor boards 2210 may be compared with the number of storage boards 2220, and a relatively large number of processor boards 2210 may be mounted on the plurality of blade servers 2200 to architect or otherwise configure the blade server 2200 as a web server system.

Alternatively, in various embodiments the number of processor boards 2210 may be compared with the number of storage boards 2220, and a relatively large number of storage boards 2220 may be mounted on the blade servers 2200 to architect or otherwise configure the blade server 2200 as a storage server system.

Meanwhile, one skilled in the art that the flexible server systems 100, 200, 300 and/or 400 according to various example embodiments of the present inventive concepts can also be applied to other types of server chasses not illustrated herein.

While the present inventive concepts have been particularly shown and described with reference to exemplary embodiments thereof, it will be understood by those of ordinary skill in the art that various changes in form and details may be made therein without departing from the spirit and scope of the present inventive concepts as defined by the following claims. It is therefore desired that the example embodiments described above be considered in all respects as illustrative and not restrictive, reference being made to the appended claims rather than the foregoing description to indicate the scope of the inventive concepts.

What is claimed is:

1. A flexible server system comprising:
an embedded processor;
one or more processor boards;
one or more storage boards; and
a switch including a plurality of ports,
the embedded processor, the one or more processor boards, and the one or more storage boards being connected to a corresponding one of the plurality of ports,
the embedded processor, the one or more processor boards, the one or more storage boards, and the switch each include a peripheral component interconnect express (PCIe) interface,
the one or more processor boards and the one or more storage boards are connected to the switch through a corresponding connector, each of the corresponding connectors have a same size, and
the embedded processor is configured to control the switch to route a packet from one of the plurality of ports to another one of the plurality of ports,
the flexible server system is configured to selectively operate as a web server system or a memory server system based on a number of the one or more processor boards and a number of the one or more storage boards.

2. The flexible server system of claim 1, wherein a number of the one or more processor boards and a number of the one or more storage boards are variable.

3. The flexible server system of claim 1, wherein the plurality of ports of the switch include an upstream port and a plurality of downstream ports, and the embedded processor is connected to the upstream port and each of the one or more processor boards and the one or more storage boards are connected to a corresponding one of the downstream ports.

4. The flexible server system of claim 1, wherein the one or more processor boards operate as a host and the one or more storage boards operate as an end point.

5. The flexible server system of claim 1, wherein each of the embedded processor and the one or more processor boards include a root complex configured to connect each of the embedded processor and the one or more processor boards to the switch.

6. The flexible server system of claim 1, wherein the embedded processor is configured to:
   read device codes of each of the one or more processor boards and each of the one or more storage boards using detection pins of each of the corresponding connectors, the device codes indicating a device type for each of the one or more processor boards and the one or more storage boards, and
   classify at least one of the one or more processor boards and the one or more storage boards according to the device codes.

7. The flexible server system of claim 6, wherein the device codes of the one or more processor boards indicate that the one or more processor boards are configured as bridge devices, and the device codes of the one or more storage boards indicate that the one or more storage boards are configured as storage devices.

8. The flexible server system of claim 1, wherein the one or more storage boards provide single root I/O virtualization (SR-IOV).

9. The flexible server system of claim 1, wherein the each of the corresponding connectors support a peripheral component interconnect-express (PCIe) interface, a small computer system interface (SCSI), a serial attached SCSI (SAS) interface, and a serial advanced technology attachment (SATA) interface.

10. The flexible server system of claim 1, further comprising:
    one or more network cards, the one or more network cards including a PCIe interface, the one or more network cards being connected to a corresponding one of the plurality of ports.

11. The flexible server system of claim 1, wherein the one or more storage boards includes a solid state drive supporting a non-volatile memory express (NVMe) interface.

12. The flexible server system of claim 1 wherein the flexible server system is configured to:
    operate as a web server system when the number of the one or more processor boards is greater than the number of the one or more storage boards,
    operate as a storage server system when the number of the one or more storage boards is greater than the number of the one or more processor boards.

13. A flexible server system comprising:
    two or more processor boards;
    one or more storage boards; and
    a switch including a plurality of ports, the two or more processor boards and the one or more storage boards being connected to a corresponding one of the plurality of ports,
    each of the one or more processor boards, the one or more storage boards, and the switch includes a peripheral component interconnect express (PCIe) interface,
    the two or more processor boards and the one or more storage boards are connected to the switch through a corresponding connector, each of the corresponding connectors having a same size, and
    one of the two or more processor boards is configured to control the switch to route a packet from one of the plurality of ports to another one of the plurality of ports,
    the flexible server system is configured to selectively operate as a web server system or a memory server system based on a number of the one or more processor boards and a number of the one or more storage boards.

14. The flexible server system of claim 13, wherein the number of the two or more processor boards and the number of the one or more storage boards are variable.

15. The flexible server system of claim 13, wherein the plurality of ports of the switch include an upstream port and a plurality of downstream ports, and the one of the two or more processor boards is connected to the upstream port and the other processor board of the two or more processor boards and the one or more storage boards are each connected to a corresponding one of the downstream ports.

16. The flexible server system of claim 13, wherein each of the two or more processor boards operate as a host, and each of the one or more storage boards operate as an end point.

17. A flexible server system comprising:
    a plurality of processor boards and a plurality of storage boards,
    the flexible server system is configured to,
    operate as a web server system when a number of the plurality of processor boards is greater than a number of the plurality of storage boards, and
    operate as a storage server system when the number of the plurality of storage boards is greater than the number of the plurality of processor boards.

18. The flexible server system of claim 17, wherein the number of the plurality of processor boards and the number of the plurality of storage boards are variable.

19. The flexible server system of claim 17, further comprising:
    an embedded processor configured to communicate with the plurality of storage boards, the plurality of processor boards, and a plurality of network cards via a switch.

20. The flexible server system of claim 19, wherein the embedded processor and the plurality of processor boards each include a root complex configured to,
    connect the embedded processor and the plurality of processor boards to the switch, and
    generate a plurality of transaction requests.

* * * * *